United States Patent Office 3,510,538
Patented May 5, 1970

3,510,538
CONTINUOUS PROCESS FOR DEHYDRATION OF TERTIARY BUTYL ALCOHOL
Rudolph Rosenthal, Broomall, Pa., assignor to Atlantic Richfield Company, Philadelphia, Pa., a corporation of Pennsylvania
No Drawing. Filed Dec. 15, 1967, Ser. No. 690,724
Int. Cl. C07c 5/22
U.S. Cl. 260—682                                    5 Claims

ABSTRACT OF THE DISCLOSURE

Method for the continuous dehydration of tertiary butyl alcohol with an ion exchange resin as the catalyst wherein water is continuously removed from the reaction zone.

BACKGROUND OF THE INVENTION

Field of the invention

This invention relates to a method for the continuous dehydration of tertiary butyl alcohol utilizing a cation exchange resin in the acid form wherein the water formed in the dehydration reaction is continuously removed from the reaction zone.

PRIOR ART

The dehydration of tertiary butyl alcohol using ion exchange resins to prepare isobutylene has been described heretofore in both patents and the technical literature.

For example, the patent to Frilette, No. 3,256,250 (1966) shows a process wherein an 8 percent divinylbenzenestyrene sulfonated resin is utilized as the catalyst for the dehydration of tertiary butyl alcohol (95 percent purity, 5 percent water) at reflux temperatures to give isobutylene in amounts of about 1.5 grams per gram of resin per hour.

An article by Chaplits et al. (Khim. Prom. 42, No. 10, 734–736 (1966)) describes the dehydration of an 80 percent tertiary butyl alcohol—20 percent water mixture at a temperature of about 85° C. under pressure using a cation exchange resin catalyst. The results obtained by this method indicate a dehydration rate of less than 0.4 gram isobutylene per gram of resin per hour.

SUMMARY OF THE INVENTION

In accordance with the present invention tertiary butyl alcohol is continuously dehydrated over a cation exchange resin catalyst with the water formed in the reaction being continuously removed in order to provide dehydration rates which are exceedingly high compared with rates obtained with prior art methods.

It is an object of this invention therefore to provide a continuous method for the dehydration of tertiary butyl alcohol to isobutylene.

It is another object of this invention to provide a continuous method for the dehydration of tertiary butyl alcohol utilizing a cation exchange resin catalyst.

It is a further object of this invention to provide a method for the continuous dehydration of tertiary butyl alcohol utilizing a cation exchange resin catalyst wherein the water formed in the reaction is continuously removed.

Other objects of this invention will be apparent from the following description of the preferred embodiments and from the claims.

DESCRIPTION OF THE PREFERRED EMBODIMENTS

The catalysts which are suitable for use in this invnetion are cation exchange resins, in particular, the sulfonic acid type cation exchange resins. These include the sulfonated coal type resins, the divinylbenzene-styrene sulfonated resins, and like conventional commercial resins. The most preferred resin is the sulfonic acid type cation exchange resin having macro-reticular structure as described in U.S. Pat. No. 3,037,052 (1962). This patent also describes the preparation of such resins, however, they are also commercially available under the trade-name Amberlyst-15 (Rohm and Haas, Philadelphia, Pa.). The resins, it should be noted, are used in the acid or hydrogen form as the name implies.

When the dehydration of tertiary butly alcohol is carried out in accordance with conventional batch methods the water which is formed has an exceedingly detrimental effect on the rate of dehydration. In accordance with the present invention the detrimental effect of water on the reaction rate is overcome by carrying out the reaction continuously in the presence of benzene which removes the water by azeotrope formation as the water is formed in the reaction mixture. By employing this method high dehydration rates are maintained over long periods of time.

It has been found that the amount of dehydration is directly proportional to the amount of catalyst in contact with the tertiary butyl alcohol. Thus, if in a given reaction 5 grams of resin is utilized and the rate is 5 grams of isobutylene per gram of resin per hour there will be produced, of course, 25 grams of isobutylene per hour. If the amount of resin is incerased to 20 grams, the amount of isobutylene formed per hour will be 100 grams. The amount of benzene to be used, therefore, should be based on the quantity of resin and in general the amount of benzene should range from about 2 to 20 times the weight of the resin. This provides sufficient benzene to form the azeotrope with the water produced in the reaction. It is, of course, obvious that larger quantities of benzene could be used, however, this merely adds to the volume of material in the reactor and does not give any improved performance.

Reaction temperatures in the range of from about 68–70° C. up to about 100° C. can be used. Temperatures in the range of 72 C. to 90 C. are particularly preferred. In order to utilize temperatures above about 80 C. it is necessary to employ superatmospheric pressures. Temperatures in excess of 100° C. are to be avoided since the isobutylene formed begins to dimerize appreciably at the higher temperatures to form diisobutylene.

The temperatures obtained in the reaction are controlled by the relative concentrations of tertiary butyl alcohol and benzene in the reactor. If the concentration of tertiary butyl alcohol is held low, temperatures approaching 80° C. at atmospheric pressure can be used with a resulting increase in reaction rate. In general, the higher temperatures, of course, favor increased reaction rates and, accordingly, such temperatures may be obtained either by reducing the concentration of tertiary butyl alcohol in the benzene or by using superatmospheric pressures as has been described. In all cases, however, the benzene is required to form the azeotrope with water so that the water can be continuously removed. Although water forms azeotropes with other hydrocarbons, benzene is the only compound suitable for use in this invention since the azeotropes formed with water boil in the desired reaction temperature range.

The isobutylene formed and the benzene-water azeotrope are removed overhead from the reaction mixture. The benzene-water azeotrope can be easily separated from the isobutylene by condensation, the benzene-water azeotrope condensing at ordinary temperatures but the isobutylene requiring low temperatures such as with a Dry-Ice trap. After condensation, the benzene and water separate to form a two-layer system. The benzene can be decanted from the water or separated by other suitable means and returned to the reactor.

The following examples are provided in order to illustrate the invention more fully. These examples, however, should not be construed as limiting the invention solely thereto.

EXAMPLE I

In order to show the effect of concentration of water admixed with the tertiary butyl alcohol on the reaction rate several runs were carried out at reflux temperatures using various tertiary butyl alcohol-water mixtures. In each run 4 grams of Amberlyst–15 cation exchange resin having a macro-reticular structure was employed together with 100 grams of a mixture of 100 percent tertiary butyl alcohol admixed with amounts of water sufficient to give the concentrations shown in Table I. In order to show the effect of temperature on isobutylene production rate, two runs were carried out at about 70° C. These runs and the results obtained are set forth in Table I. Since these were batch runs no benzene was employed.

TABLE I

| Run No. | Temp., ° C. | Weight percent tertiary butyl alcohol | Isobutylene, g./g. resin/hour |
|---|---|---|---|
| 1 | 75–77 | 97–100 | >10 |
| 2 | 77.5 | 92.3 | 5.20 |
| 3 | 78.5 | 85.9 | 3.13 |
| 4 | 79.5 | 78.9 | 2.06 |
| 5 | 80 | 75.8 | 1.65 |
| 6 | 80 | 63.0 | 1.29 |
| 7 | 80 | 36.0 | 0.75 |
| 8 | 80 | 16.4 | 0.43 |
| 9 | 70 | 78.5 | 0.476 |
| 10 | 70 | 76.1 | 0.421 |

It will be seen from these results that the rates drop off very sharply as soon as the water concentration begins to increase, dropping from over 10 grams of isobutylene per gram of resin per hour at 97 to 100 percent concentration tertiary butyl alcohol to about 2 grams of isobutylene per gram of resin per hour at about 79 percent tertiary butyl alcohol concentration (run No. 4). When the concentration of water exceeds about 50 percent, according to these results, the dehydration rate drops to less than 1 gram of isobutylene per gram of resin per hour. If run No. 9 is compared with run No. 4 (the concentration of tertiary butyl alcohol and water being approximately the same in each run) it will be seen that the lower temperature gives much lower rates. A similar comparison can be made between run No. 5 and run No. 10.

EXAMPLE II

In order to demonstrate the instant invention, a 500 ml. four-necked round bottom flask was fitted with a mechanical stirrer, thermometer, dropping funnel and a 12-inch glass helices-packed column. Attached to the column was a modified Dean-Stark trap and a condenser leading to a Dry-Ice trap. In the flask were placed 6.6 grams Amberlyst–15 resin (acid form) and 60 grams of benzene. An additional 17.2 grams of benzene was placed in the Dean-Stark trap. The mixture was heated with stirring to 71° C. and 100 grams of tertiary butyl alcohol was dropped into the flask over a period of 2.25 hours. During this time the temperature was held at 71–73° C. and 24.5 ml. of water was collected in the Dean-Stark trap and 69.8 grams of isobutylene was collected in the Dry-Ice trap. This represents an isobutylene formation rate of 4.7 grams per gram of resin per hour which is approximately 10 times the rate obtained if the water concentration were permitted to build up in the reaction mixture as shown in Table I of Example I. When higher temperatures are employed, i.e. of the order of 75° to 80° C. it is possible to achieve higher rates of the order of 10 grams of isobutylene per gram of resin per hour.

The liquid phase oxidation of isobutane with molecular oxygen produces two main products; one being tertiary butyl hydroperoxide the other being tertiary butyl alcohol. The oxidation reaction is carried out at temperatures in the range of from about 200° F. to about 300° F. at pressures in the range of from about 400 to 700 p.s.i.g. The reaction is preferably carried out in the absence of a catalyst, particularly in the absence of metal ions. The tertiary butyl alcohol produced by this method contains water, acetone, methanol, tertiary butyl formate and trace amounts of hydrocarbons, aldehydes and other oxygenated compounds. In order to show that the method of this invention is applicable to tertiary butyl alcohol produced by this method, the run set forth in Example III, following, was carried out.

EXAMPLE III

Into the apparatus described in Example II was placed 6.2 grams of the Amberlyst–15 resin recovered from the run of Example II, 60 grams benzene and 15.0 grams of a tertiary butyl alcohol solution containing 89.6 weight percent tertiary butyl alcohol, 1.5 weight percent water, 5.5 weight percent acetone, 0.8 weight percent methanol, 0.6 weight percent tertiary butyl formate with the remainder being trace amounts of hydrocarbons, aldehydes and other oxygenated compounds. This solution is typical of the tertiary butyl alcohol solution obtained by the commercial oxidation of isobutane. In the Dean-Stark trap was placed 20 grams of benzene. The flask was heated to 72° C. and an additional 420 grams of the tertiary butyl alcohol solution described was added at the rate of 50 ml. per hour. The Dean-Stark trap was modified by being provided with a stopcock to permit water which separated to be drawn off. The acetone contaminant also was separated in the water phase and the water-acetone draw-off rate was about 12 ml. per hour. After the tertiary butyl alcohol solution was completely added the temperature was allowed to rise to 80° C. to complete the dehydration of the alcohol. The final quantity of water and acetone solution removed through the Dean-Stark trap was 134 ml. (128.8 g.). The amount of product collected in the Dry-Ice trap was 308.7 grams. This product was almost entirely isobutylene with a small amount of higher boiling components which had been carried over with the isobutylene vapor. These components were water soluble. In commercial operation a scrubber system would be utilized to remove such components from the isobutylene prior to collecting the isobutylene.

The method of this invention gives very high purity isobutylene in contrast to the products which are obtained by sulfuric acid dehydration or high temperature vapor phase catalytic dehydrations. Analysis of the residues remaining at the end of the reactions showed no evidence of diisobutylene formation. The isobutylene contained essentially no impurities not present in the starting materials. Purities of over 99.9 weight percent are achieved readily by the method of this invention.

As many possible embodiments can be made of this invention without departing from the broad scope thereof, it is to be understood that all matter herein set forth is to be interpreted as illustrative and not as unduly limiting the invention.

I claim:
1. A method of continuously dehydrating tertiary butyl alcohol to isobutylene which comprises contacting the tertiary butyl alcohol in the presence of benzene with a cation exchange resin at a temperature in the range of from about 68° to 100° C. and continuously removing the water formed in the reaction as a benzene-water azeotrope.

2. The method according to claim 1 wherein the temperature is in the range of from 72° to 90° C.

3. The method according to claim 1 wherein the cation exchange resin is the sulfonated coal type.

4. The method according to claim 1 wherein the cation exchange resin is the sulfonated divinylbenzenestyrene type.

5. The method according to claim 1 wherein the cation exchange resin is the sulfonic acid type having a macroreticular structure.

References Cited

UNITED STATES PATENTS 3,256,250  6/1966  Frilette _____ 260—682 X
3,328,471  7/1967  Kronig et al. _____ 260—682 X DELBERT E. GANTZ, Primary Examiner G. E. SCHMITKONS, Assistant Examiner